Nov. 4, 1969 F. A. FEND 3,476,473

FONT INDICATOR

Filed March 13, 1967 2 Sheets-Sheet 1

INVENTOR.
FREDERICK A. FEND

BY Ronald Zibelli

ATTORNEYS

Nov. 4, 1969 F. A. FEND 3,476,473

FONT INDICATOR

Filed March 13, 1967 2 Sheets-Sheet 2

INVENTOR.
FREDERICK A. FEND
BY Ronald Zibelli
ATTORNEYS

United States Patent Office 3,476,473

Patented Nov. 4, 1969

3,476,473
FONT INDICATOR

Frederick A. Fend, Pittsford, N.Y., assignor to Xerox Corporation, Rochester, N.Y., a corporation of New York Filed Mar. 13, 1967, Ser. No. 622,637
Int. Cl. G03b *21/26*
U.S. Cl. 353—28 5 Claims

ABSTRACT OF THE DISCLOSURE

An apparatus which indicates to the operator of a multi-font machine the particular array of characters or symbols available in the font in which the machine is operating at any particular time. A semi-transparent, semi-reflecting plate is positioned between the operator's eyes and the unmarked keyboard through which the operator is able to observe the individual keys on the keyboard. An image generator placed on the same side of the plate as the operator's eyes casts a matrix of images upon the plate which are reflected therefrom to the operator's eyes. The operator sees the reflected image being superimposed on the unmarked keys which creates the illusion that each reflected image is physically located on a key. When the font is changed in the machine, the matrix of images cast onto the plate and reflected is altered accordingly so that the apparent markings on the keys always represents the font being used at any particular time.

BACKGROUND OF THE INVENTION

Composing of characters can be done in a variety of ways such as by using the techniques of typesetting, photocomposing, electrotyping, lithotyping, typewriting, and so forth. Many of these techniques very easily lend themselves to an automatic system whereby the input data is punched into the machine on a keyboard. For instance, the linotype and monotype systems are examples of automatic typesetting systems which can be activated by a keyboard. Although these systems are essentially error-free once the keyboard is given the correct information, an error occurs if the operator punches the wrong information into the keyboard.

In the typesetters and other composing machines where a number of different fonts are constantly being used, the chance of error resulting from the operator feeding in erroneous information is greatly increased. When the font is continuously changing during composing, it is difficult for the operator to remember which particular font he is using. Even if the font style is indicated on the machine, the indicators presently in use cannot be referred to and read by the operator quickly as he is working along.

This problem is especially aggravating when a keyboard is used to activate the machine since a proficient operator can operate the keys very rapidly and efficiently. The problem of changing fonts is even more burdensome to the operator if the font change represents a change in the nature of the characters rather than merely a change in character size or case. For example, if a multi-font machine consists of fonts representing the Roman alphabet, Greek alphabet, mathematical symbols, scientific symbols, ideagraphic symbols, etc., each key on the keyboard would be too small to contain all the symbols it could activate. A quick reference system to keep the operator continually aware of the font in which the machine is operating is greatly needed especially when input data is entered through a keyboard.

The present invention is intended to improve upon font indicators in the prior art and, accordingly, it is an object of this invention to provide a novel font indicator which overcomes the deficiencies of the prior art devices as described above.

It is a further object of the invention to provide an improved way of indicating to the operator of a multi-font machine the particular font in which the machine is being utilized.

It is a further object of the invention to provide an improved font indicator by which the operator is kept informed of the alphabet, families of symbols, or styles of the font being used.

It is a further object of the invention to provide an improved keyboard for a multi-font machine in which the surfaces of the keys need not be marked with the symbol or symbols it activates.

SUMMARY

The objects of the invention are accomplished, generally speaking, by placing a half-silvered mirror between the operator's eyes and the keyboard of a multi-font machine. The nature of the mirror is such that it is semi-transparent and semi-reflecting in order that the keys of the keyboard can be seen through the mirror by the operator, and, simultaneously, the character images cast upon the mirror are reflected back to the operator's eyes. The character images, which originate from the same side of the mirror as that where the operator's eyes are located, are cast on the mirror in such a manner that the loaction of each character coincides with a key seen by the operator through the mirror. As a result, the characters appear to be located on the keys themselves.

The distance between the operator's eyes and the mirror is preferably equivalent to the distance between the keys and the mirror in order to avoid any mal-alignment between the image reflected by the mirror and the keys should the operator shift the location of his head. In addition, the distance between the mirror and the keyboard should be sufficiently large to allow for the free movement of the operator's hands on the keyboard while typing. As the font is changed in the machine, the character images are automatically changed so that the images seen by the operator represent those of the font locked into the machine at that particular moment.

BRIEF DESCRIPTION OF THE DRAWINGS

The foregoing and other objects, features and advantages of the present invention will become apparent from the following description when taken in conjunction with the accompanying drawings which illustrate one embodiment of the invention and in which.

DESCRIPTION OF THE PREFERRED EMBODIMENT

Figure 1:
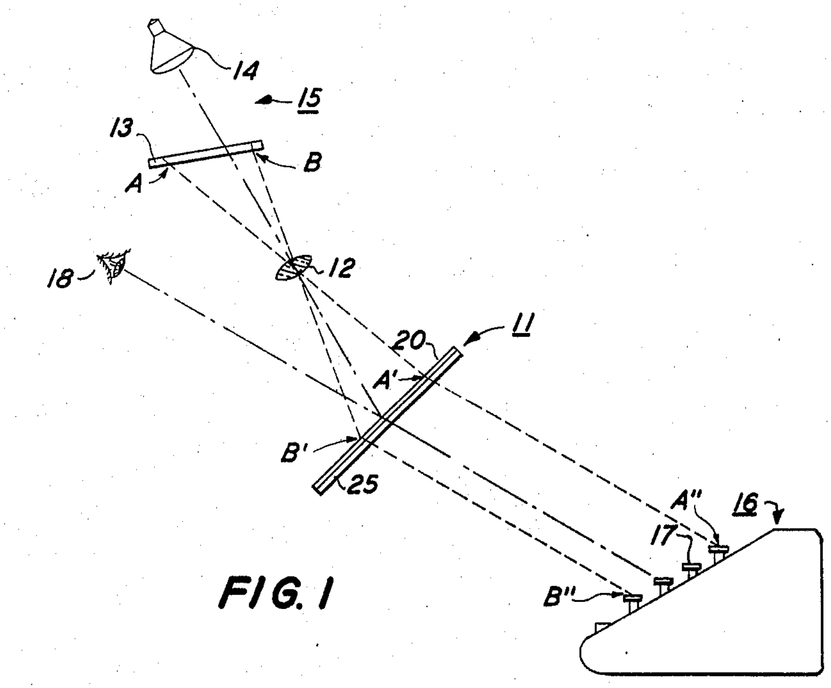
FIGURE 1 is a schematic illustration showing the arrangement of the image generator and semi-transparent, semi-reflecting plate with respect to the operator's eye and the keyboard.

The general arrangement of the apparatus is shown in FIGURE 1. Essentially, there are three elements of the apparatus which should maintain a fixed relationship to one another. Semi-transparent, semi-reflecting plate 11 must be positioned relative to input register 16 so that the line of vision between the operator's eyes 18 and each key 17 on the input register passes through plate 11. In addition, image generator 15 is so located relative to plate 11 that the array of images cast onto the plate and reflected by the plate appears to the operator coincident with keys on the input register. In put register 16 can be any type of input system which is operated by activating one or a combination of data entry sites such as keys, switches, dials, buttons, or the like. The particular system used for the purpose of this explanation is the familar keyboard having individually punchable keys similar to a typewriter keyboard.

Plate 11 is a semi-transparent, semi-reflecting element. The plate must have enough transparency so that the operator can clearly see the keys on the keyboard through the plate while, at the same time, it must have sufficient reflecting quality so that an image projected onto the plate is reflected by it in sufficient resolution to allow the operator to clearly distinguish the character images at a glance. Any material or assembly of materials having the above qualities can be used for plate 11 such as a half-silvered mirror, polarized material, plexiglass, etc. For instance, illustrated in FIGURE 1 is a half-silvered mirror consisting of two layers in the plate assembly, an ordinary piece of clear glass 25 coated with a very thin metallic film 20. The metallic film is of such thickness that it transmits approximately one-half the light falling on it at normal incidence and reflects the other half. An example of such a plate is a ¼ inch thick piece of ordinary window glass having a layer of silver monoxide approximately 1,000 angstroms thick disposed over it. In the alternative, ordinary window glass can be coated with a 100 angstrom thick layer of aluminum and further coated with a protective material to prevent the aluminum from oxizing.

Although the reflecting film on the glass can be placed on either side of the glass, it is more advantageous to coat the surface of the glass nearest the operator's eyes. Placing the reflecting layer on this side of the glass is preferred because normal glass has some natural reflecting qualities and if the reflecting layer were placed on the keyboard side of the glass, the effective reflecting quality of the plate would be increased, and would include the light reflected from the top surface of the glass as well as that reflected by the film. Further, a ghost image may be created; that is, a first image created by the natural reflection of the glass and the second by the underlying reflecting film, and this situation would be undersirable. On the other hand, when the side of the glass nearest the operator's eyes is coated the natural reflecting quality of the top surface of the glass is of no great consequence to the plate as a whole.

Image generator 15 casts a matrix of images onto plate 11 from the same side of the plate as that where the operator's eyes are located. The image is reflected from the plate to the operator's eye in a path coincident with the line of vision between the operator's eye and the keys on the keybord. The design of the image generator is not critical to the invention so long as the generator used places clear, well-defined characters on the plate.

In FIGURE 1, the image generator is schematically illustrated by light source 14, transparency 13 and lens 12. The images (not shown) on transparency 13 must be optically reversed in order to appear right reading to the operator and their arrangement should coincide with the physical arrangement of individual keys 17 on the input register. Lens 12 is placed between the transparency and plate to assure that the size of the images reflected by the plate is proper regardless of the size of the images on the transparency or the distance between the image generator and plate.

The image generator can be placed any suitable distance from plate 11 and a satisfactory image will result. However, it is preferable to keep the image generator a fixed distance from the plate, that is, a distance approximately equivalent to the distance between the plate and the keyboard. The significance of this preferred spacing is explained in conjunction with FIGURE 2.

Figure 2:
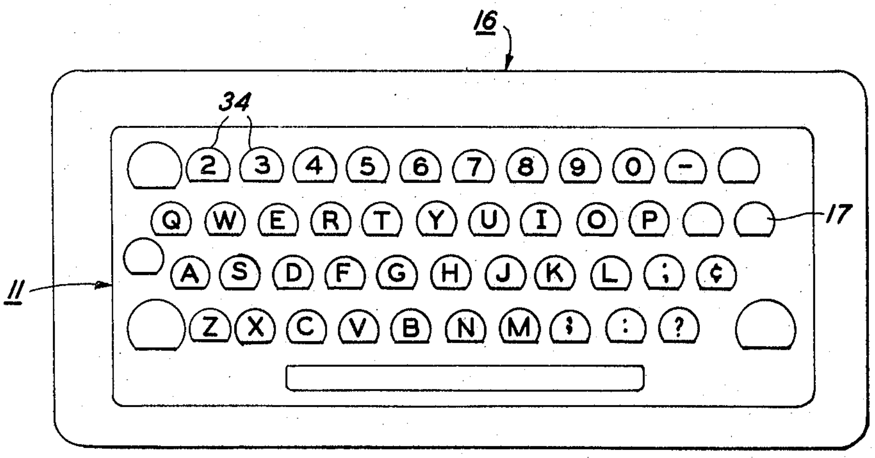
FIGURE 2 is a schematic illustration of the view the operator has when he looks at the keyboard through the semi-transparent, semi-reflecting plate.

FIGURE 2 represents the operator's view while looking at the keyboard through plate 11. Input register 16 has unmarked keys 17 which the operator sees clearly through plate 11. Plate 11 is large enough to contain all individual keys 17 on the input register within its edges and the plate is located so that each key can be seen through it. To the operator, images 34 appear to be located on the surfaces of key 17 although in actuality they are reflected by plate 11 in register with their respective keys.

Generally speaking, transparency 13 can be located at any orientation relative to plate 11 that permits it to render visible images in the plate, however, the preferred orientation of the transparency is shown in FIGURE 1. Points A and B on the transparency represent the location of the row of images for the bottom, B'', and top, A'', rows of keys on the keyboard respectively. Points A' and B' on plate 11 designate the location where the rows of images are actually reflected by the plate. To assure proper registration between each key and its image, the distance between points A and A' and points B and B' must be equal to the distance between A' and A'' and points B' and B'' respectively. When these distances are equal parallax is avoided and the real images generated by transparency 13 are optically located on the surfaces of the keys regardless of the position of the operator's head.

Figure 3:
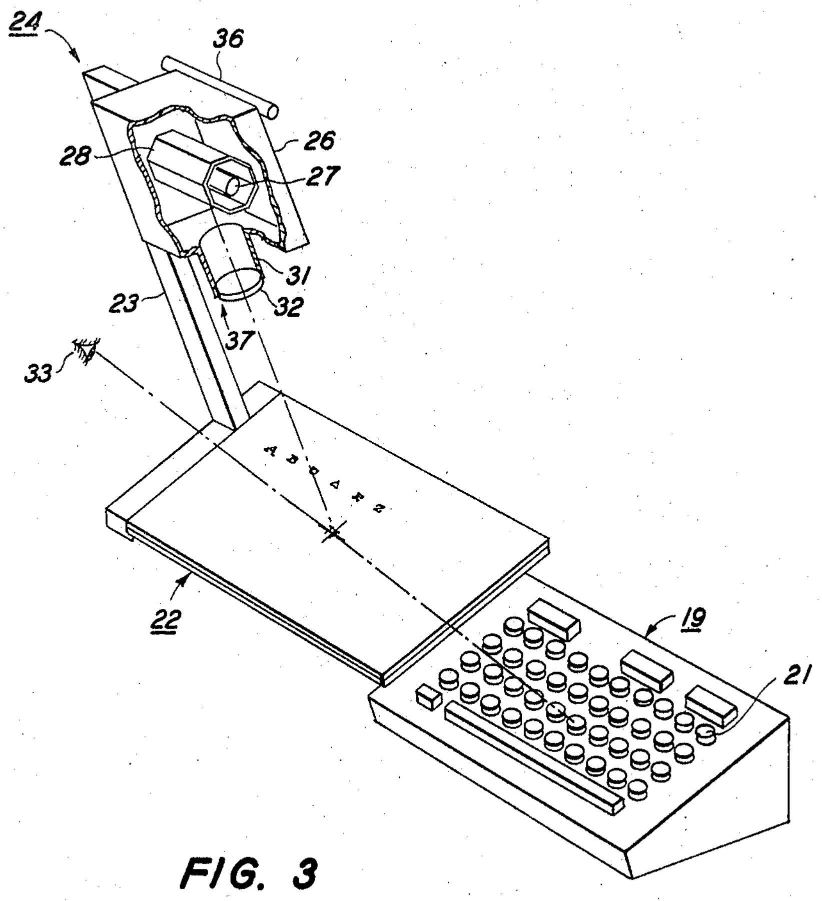
FIGURE 3 is a partially sectioned view of the image generator and its location in relation to the operator's eye, plate and keyboard.

FIGURE 3 shows a more unitized construction for the font indicator. The entire indicator may be swung out of the vicinity of the keyboard when not used by rotating it about pivot bar 36. Image generator 24 maintains a fixed relationship to plate 22 through support 23 so that when the unit is brought into working position the plate will not have to be adjusted. Image generator 24 consists of cabinet 26, illuminator 27, transparencies 28 and lens system 37. The number of transparencies 28 in the cabinet correspond to the number of different fonts in the composing machine to which input register 19 with keys 21 is attached. In FIGURE 3, for example, there are eight fonts (not shown) and, therefore, eight transparencies are mounted around illuminator 27, one transparency for each font. These transparencies are mounted on a rotatable frame (not shown) which assures that the correct transparency is placed between the illuminator and lens system when the keyboard is operating in a particular font. Lens system 37 consists of a lens barrel 31 and movable lens 32 which can be adjusted to optimize the focus of the characters on plate 22.

In such an automated arrangement the operator merely swings the font indicator into operating position and operates the keys according to the input data. The images represented on the plate at any given time are indicative of the font in which the machine is operating at that time.

In addition to the apparatus outlined above many other modifications and/or additions to this invention will be readily apparent to those skilled in the art upon reading this disclosure, and these are intended to be encompassed within the spirit of the invention.

What is claimed is:

1. An apparatus which visually indicates to an operator's eyes the font in which an input register is operating comprising:

(a) an input register having at least one manually operable data entry site, (b) a semi-transparent, semi-reflecting plate disposed between said register and said operator's eyes, and (c) means to generate an image on the side of said plate nearest said operator's eyes, said image being coincident with the lines of vision between said data entry site and said operator's eyes.

2. An apparatus according to claim 1 in which said input register is a keyboard having manually punchable keyes, and said plate is positioned a remote distance from said keys so that said operator has sufficient space in which to activate said keys.

3. An apparatus according to claim 2 in which said plate is a flat, thin plate having sufficient surface area on one of its flat surfaces to encompass all said keys on said keyboard.

4. An apparatus according to claim 1 in which said means to generate an image comprises an illuminator located adjacent said plate and on the side of said plate nearest the operator's eyes and a transparency located between said illuminator and said plate.

5. An apparatus according to claim 1 in which said means to generate an image comprises more than one transparency, an illuminator and means to automatically place the specific one of said transparencies which represents the font in which said register is operating between said illuminator and said plate.

References Cited

UNITED STATES PATENTS 2,673,492 3/1954 Reswick.

NORTON ANSHER, Primary Examiner

R. L. MOSES, Assistant Examiner

U.S. Cl. X.R.

95—4.5; 353—36